(12) United States Patent
West et al.

(10) Patent No.: US 11,997,411 B2
(45) Date of Patent: May 28, 2024

(54) CONTACTLESS PHOTO SYSTEM

(71) Applicant: Studio Pod Pro, Inc., Houston, TX (US)

(72) Inventors: Joseph West, Houston, TX (US); Christopher Bradley Bailey, Houston, TX (US)

(73) Assignee: Studio Pod Pro, Inc., Houston, TX (US)

( * ) Notice: Subject to any disclaimer, the term of this patent is extended or adjusted under 35 U.S.C. 154(b) by 0 days.

(21) Appl. No.: 18/165,466

(22) Filed: Feb. 7, 2023

(65) Prior Publication Data

US 2023/0254441 A1 Aug. 10, 2023

Related U.S. Application Data

(60) Provisional application No. 63/267,725, filed on Feb. 9, 2022.

(51) Int. Cl.
*H04N 5/28* (2006.01)
*H04N 7/18* (2006.01)
*H04N 23/60* (2023.01)
*H04N 23/62* (2023.01)

(52) U.S. Cl.
CPC ............... *H04N 5/28* (2013.01); *H04N 7/183* (2013.01); *H04N 23/62* (2023.01); *H04N 23/64* (2023.01)

(58) Field of Classification Search
CPC ........................................................ H04N 5/28
USPC ........................................................ 348/207.1
See application file for complete search history.

(56) References Cited

U.S. PATENT DOCUMENTS

| | | | | |
|---|---|---|---|---|
| 2015/0350551 | A1* | 12/2015 | Harris | H04N 23/667 348/333.02 |
| 2017/0237888 | A1* | 8/2017 | Harris | H04N 23/70 348/77 |
| 2018/0270410 | A1* | 9/2018 | Lyle | H04N 23/51 |

* cited by examiner

*Primary Examiner* — Joel W Fosselman
(74) *Attorney, Agent, or Firm* — Lee & Hayes, P.C.

(57) ABSTRACT

A contactless photobooth system configured with a viewing screen, user interface, and light sources. The contactless photobooth system to allow a client representative to schedule and obtain photos of a subject different than the client with controlled lighting parameters without requiring the subject to travel to a studio.

20 Claims, 10 Drawing Sheets

CONTACTLESS PHOTO SYSTEM

CROSS-REFERENCE TO RELATED APPLICATION(S)

This application claims priority to U.S. Provisional Application No. 63/267,725 filed on Feb. 9, 2022 and entitled "CONTACTLESS PHOTO SYSTEM", which is incorporated herein by reference in its entirety.

BACKGROUND

Many companies and organization utilize professional photographer for employee or member photos. Typically, the organization sends the member to a selected photographer and the photographer captures a handful of photos which are then provided to the organization for use. However, this process requires the organization to locate and select photographers in many different geographic locations, have tightly scheduled appointment windows, and the resulting photos are of varied quality and, often, style, which can detract from an overall aesthetic when used in conjunction with each other.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
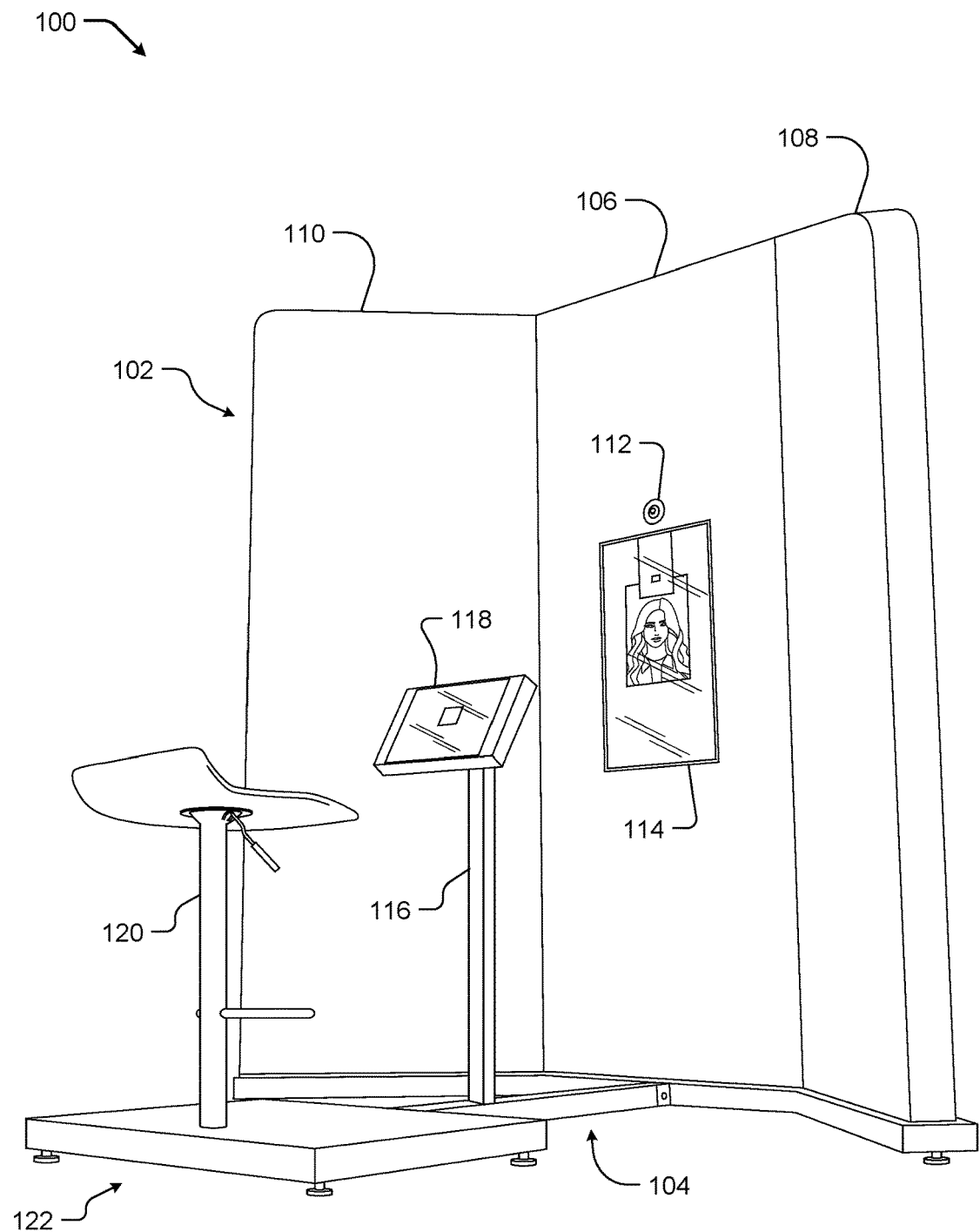
FIG. 1 illustrates an example pictorial view of a photobooth system according to some implementations.

This disclosure includes systems and implementations for providing an on-site contactless photo or video sessions that provide a consistent and cohesive style and aesthetic across multiple sessions. For example, the system may include a cloud-based service that allows a manager, officer, member, employee, or even an individual (e.g., the client) to schedule an on-site (e.g., at home, in office, or the like) photo session. The cloud-based service or management system may allow the client to specify or otherwise select photo quality, style, parameters (such as lighting), color palette, shadows, subject positions, posture, and the like, number of photos, etc. The client may also utilize the cloud-based service to select a location (or locations) and a window of time (such as a number of days, week, month, or the like) for the photo session to take place.

In some cases, the photobooth may then be delivered to the selected or designated locations. The photobooth may, thus, be assembled on-site at the designated locations and the photos captured on-site. For example, the photobooth may include a packed or closed position and be configured to transition to an open or assembled position. In this example, the photobooth may be shipped and/or delivered to the designated locations in the closed positioned and the photo session may be performed in the open or assembled position.

In some cases, the photobooth may include a viewing display that allows the subject of the photo to view the current capture state of the image devices, lighting, and overall booth. In some cases, the viewing display may also allow the subject to review the photos to select a final photo or to determine if a retake is desired. The viewing display may also be utilizable for a video conference such as with the client (e.g., the individual or organization that organized the photo session).

The photobooth may also include a user interface, such as a touch enabled display, to allow the user to interact with the booth (e.g., adjust parameters, initiate the session, review and/or retake the photos, and the like). In some cases, the user interface may allow present choices to the subject such as suggested or recommended lighting parameters or settings, shadow parameters, exposure or other intrinsic camera properties. In some cases, such as when the user interface is a touch enabled display, the subject may also be able to review or otherwise scroll through the captured photos during or after a session. The user interface may also be used to capture additional demographic information on the subject (e.g., information not provided by the client) such as a personal phone number or email for receiving the final photos.

The photobooth may also include a first light source positioned to the left of the viewing screen and/or a second light source positioned to the right of the light source. Each of the light sources may include a plurality of individual illuminators or zones (e.g., sets/groups of illuminators) that may be controlled (e.g., brightened, dimmed, colored, or otherwise adjusted) on an individual basis. In some examples, the client requesting the photo session may be able to specify the lighting parameters or configuration for each light source and/or each zone. In some cases, the cloud-based service may allow the client to select from a polarity of lighting options at the time the manger books the photo session. In some cases, the organization may have an account with the cloud-based service, such that the lighting setting may be selected for the entire account to enhance the cohesiveness of the disparate photo sessions for the organization's members.

In some implementations, one or more image capture devices (such a one or more cameras, sensors, video devices, or the like) may be configured or positioned proximate to the viewing screen when the photobooth is in the open or assembled position. In some examples, the image device may be a mono or single camera while in other examples a stereo pair of image devices may be utilized. The photobooth may also include a depth sensor or determine depth based at least in part on the stereo images to assist the photobooth in auto focus or positioning of the subject. For instance, the photobooth may include a seat, stool, designation, or other position for the subject to stand and/or sit during the session. The designated position may be proximate (e.g., within arm's length) of the user interface to allow the subject to interact with the user interface during the photo session.

In some cases, the photobooth may utilize depth data or image data captured by the one or more image devices or depth sensors to determine if the subject is properly positioned with respect to the viewing screen, the light sources, and/or the image devices themselves. In other examples, the photobooth may utilize the image data and/or depth data captured to generate instructions for adjusting the position of the viewing screen, the first light source, the second light source, or the like with respect to the designated position and/or the user interface.

In some examples, once the photobooth is assembled (e.g., in the open position or configuration) and the photobooth has confirmed the positioning of the light sources, viewing screen, image devices, designated area and the like, the photobooth may display instructions for the subject via the user interface and/or the viewing screen. For example, the photobooth may display instructions to the subject to position themselves with respect to the designated position and capture an initialization photo set or image data of the subject. The initialization image data may be used to confirm the identity of the subject, such as via a facial recognition or scanning of an identifier (e.g., an ID badge, number, or the like associated with the client).

The initialization image data may be used to generate additional instructions for the subject and/or to confirm the subject's attire, body position, and the like. For example, the photobooth may display instructions associated with the proper attire (e.g., as indicated by the client, such as the organization, the manager, the individual, or the like), body positioning (e.g., seated, standing, head tilt, arm position, and the like), and the like. For instance, if the subject is in jeans and a t-shirt, the photobooth may request the subject change into a collared shirt and slacks before the photo session is initiated.

In other examples, the photobooth may utilize the initialization image data to determine any adjustments to the lighting parameters (such as adjusting a brightness of a light source or lighting zone) based on detected shadows or other environmental conditions while the subject is positioned for the photo session. For instance, the photobooth may determine intensities for the zones from a minimum brightness of 1 to a maximum brightness of 255, color, temperature, settings or a focal point, shutter speed, exposure length, aperture size, ISO, or the like, among others.

In various implementations, once the initialization is complete, the photobooth may commence the photo session. For example, the subject's identity is confirmed, the subject's attire and body positioning is approved, the system settings (e.g., lighting) are determined, the photobooth may commence the session. During the session, one or more photos may be captured by the photobooth that represent the subject. The photobooth may include a timer displayed on the viewing screen to allow the subject to be aware of when each photo is captured. The viewing screen may also display the image data of the subject in real-time so that the subject may have real-time feedback as to the photos (e.g., the subject may see on the viewing screen what the image devices of the photobooth is capturing). The real-time feedback or visual data may allow the subject to adjust themselves during the photo session (such as between capture events or while the timer is counting down). In some cases, the photobooth may allow an individual associated with the client to view the photo session, such that the user may provide real-time feedback to the subject.

During the session or after the photo session is complete, the photobooth may provide or otherwise display the photos to the subject and/or the client. For example, the photos may first be displayed to the subject via the viewing screen and/or the user interface. The subject may then be allowed to select or approve a subset of the photos (e.g., one to all of the photos) for presentation to the client. In some cases, if the subject rejects all of the photos or a threshold number of photos, the photobooth may allow the subject to enter one or more retake sessions. In some examples, once the subject approves the photos, the photos may be provided to the client for a final selection and/or use. For example, the client may select one or more (e.g., a predetermined number of) photos from the approved set. The final selected photos may then be provided to the client and/or the subject, such as via an email, text message, download, or the like.

In some examples, machine learned models and/or networks (such as a neural network) may be unitized by the photobooth system and/or the cloud-based services to assist with determining parameters based at least in part on environmental conditions and image data representing the environment and the subject in a manner discussed herein. The machine learned models and/or networks may be trained using image data and/or sensor data captured by photobooths at locations as well as subject and client inputs or selections via the user interface and/or the cloud-based service, respectively. It should be understood that any type of machine learning may be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing technique and/or a combination thereof.

As discussed herein, the processing of the image data and the parameter determination may be performed by applications hosted by the cloud-based services, downloaded onto the photobooth, and/or downloaded onto a user device. It should also be understood that some or all of the processing may be performed by a cloud-based services that may receive the data (e.g., images, frames, sensor data, environmental conditions, and the like) via a communication interface of the photobooth.

As discussed herein, the term photo secession and photo are used. However, it should be understood that the photobooth may also be used to generate a video session, such as for social media, and the resulting output would be a video or series of photos or frames. In these cases, the photobooth may receive an input form the client or the subject to determine a length of the video (e.g., a time length, number of frames, or the like).

Figure 2:
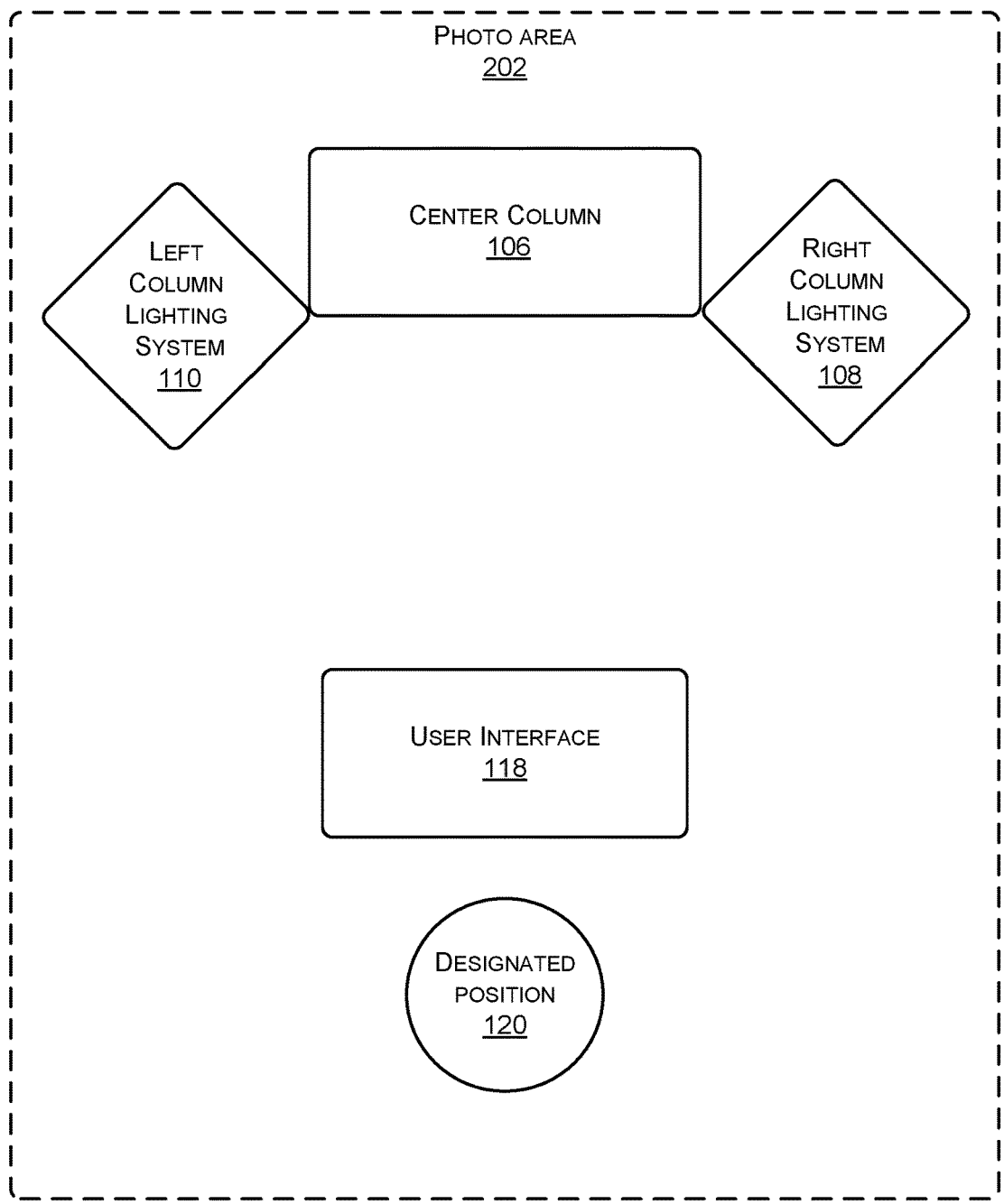
FIG. 2 illustrates an example overhead arrangement of a photobooth system according to some implementations.

FIGS. 1 and 2 illustrate an example photobooth system 100 according to some implementations. In the current example, the photobooth system 100 may include an upright assembly 102 and a base 104. The upright assembly 102 may include a center column 106, a right column 108, and a left column 110. The center column 106 may be configured with one or more image devices 112 and a viewing screen 114. In some examples, the columns 106-110 of the upright assembly 102 may be fixedly or releasably coupled to each other and similarly fixedly or releasably coupled to the base 104. For example, the columns 106-110 may snap, screw, or otherwise couple to base 104, such that the upright assembly 102 and the base or the columns 106-110 and/or the base 104 may be transported as individual units. In other examples, the columns 106-110 may be hingedly coupled to the base 104, such that the upright assembly 102 and the base 104 may be transported as a single unit.

The base 104 may be coupled (e.g., reliably coupled, hingedly coupled, fixed, or otherwise coupled) to a center console 116 that may be equipped with or include an integrated user interface 118. As shown, the center console 116 may extended upright parallel to the upright assembly 102 and perpendicular to the base 104. As discussed above, the base 104 may also be coupled or releasable coupled to a designated position 120 for the subject (not shown), such as the seat illustrated in the current example. Again, the seat may be coupled (e.g., reliably coupled, hingedly coupled, fixed, or otherwise coupled) extend upward from the base 104 such that the seat is parallel to the center console 116 and the upright assembly 102. In some cases, the height of the seat may be adjustable based on, for instance, the height of the subject.

In some cases, the photobooth system 100 may be transitioned between a first or open configuration, as shown in the current example, and a second or closed position. In these cases, the designated position 120 may decouple from (e.g., the seat is releasably coupled to) the base 104. The center console 116 may fold downward or also decuple from the base 104. The upright assembly 102 may also be hingedly coupled to the base 104 such that the entire assembly 102 or each portion of the assembly 102 (e.g., the center column 106, the right column 108 and the left column 110) may independently fold or transition downward towards a top portion, herein indicated by 122, of the base 104. In this manner, the photobooth system 100 may both serve as a photobooth with proper or professional lighting and real-time photo feedback while still being compact enough in the closed position for ease of transport to different locations.

The right column 108 and the left column 110 of the upright assembly 102 may be configured as light sources, such as an array or grid of light emitting diodes (LEDs) that may be controlled (e.g., dimmed or brightened, color tuned, or the like) in substantially real-time based at least in part on image data of the subject, environmental conditions, detected shadows, or the like. In some cases, by positing the light sources to the right and left of the subject may provide more uniform lighting, lower shadow effects, and the like with respect to the resulting photos. In the current example, the light sources may be covered by a light diffusing layer such that softer more even light results during the photo session. In some cases, the light sources may be arranged in zones (or individual LEDs) such that different lighting zones may be configured with different lighting parameters, such as to effect high or low lighting, various color configurations, desired shadowing, color, cropping, blur, lighting, focus, brightness, contrast, highlights, saturation, warmth, tint, skin tone, noise, or the like. In one specific example, each of the right and left columns 108 and 110 may include six zones (such as three rows arranged in two columns).

As discussed above, the image devices 112 may be configured to capture image data (e.g., frames, video, still images, color images, monochromic image data, depth data, and the like) of the subject. In the current example a single image device 112 is illustrated, however, it should be understood that in other examples, multiple image devices may be used. For example, a stereo pair of image devices may be used to assist in generating a three-dimensional image of the subject if requested by the client. In some cases, the image devices 112 may also be paired with or include other sensors, such as ambient light sensors, depth sensors, motion sensors, or the like. For instance, the ambient light sensors may be utilized to determine or adjust the light sources of the right column 108 and the left column 110. The depth sensors may assist in determining the correct position and/or presence of the subject and the motion sensors may determine if the subject is still and/or if there is no (e.g., less than a threshold amount) background motion before capturing a photo.

The viewing screen 114 may be used to provide real-time feedback of the captured photos to the subject as well as to allow the subject to view themselves during the photo session while remaining in a proper position (e.g., upright on the seat). In some examples, the viewing screen 114 may also provide feedback to the subject, such as suggestions on posture, a countdown clock or timer so that the subject knows when the photo will be taken and reduce retakes (e.g., the subject may smile at the appropriate time without fatigue).

The user interface 118 may allow the subject to interact with the photobooth system 100. For example, the user interface 118 may allow the subject to adjust parameters of the photobooth system 100, review captured photos, select desired photos, start a capture or recapture session, and the like. In the current example, the user interface 118 may be a touch-enabled display to both provide visual data to the subject and receive user inputs. In other examples, the user interface 118 may include one or more displays and/or tactile user input devices (e.g., mouse ball, buttons, keyboard, or the like).

In the current example, a photobooth system with three columns is illustrated. However, it should be understood that the photobooth may have any number of columns. For example, the photobooth may have a single column (with integrated lighting sources, image device, and/or viewing screen). In other examples, the system may have eight columns to form a more full enclosure. In this example, each of the eight columns may have a lighting source or illumination. In some cases, each of the columns may have a grid or zones associated with lighting such that even or tuned light may be provided from each of the eight surfaces to further improve the quality if the resulting photos.

Figure 3:
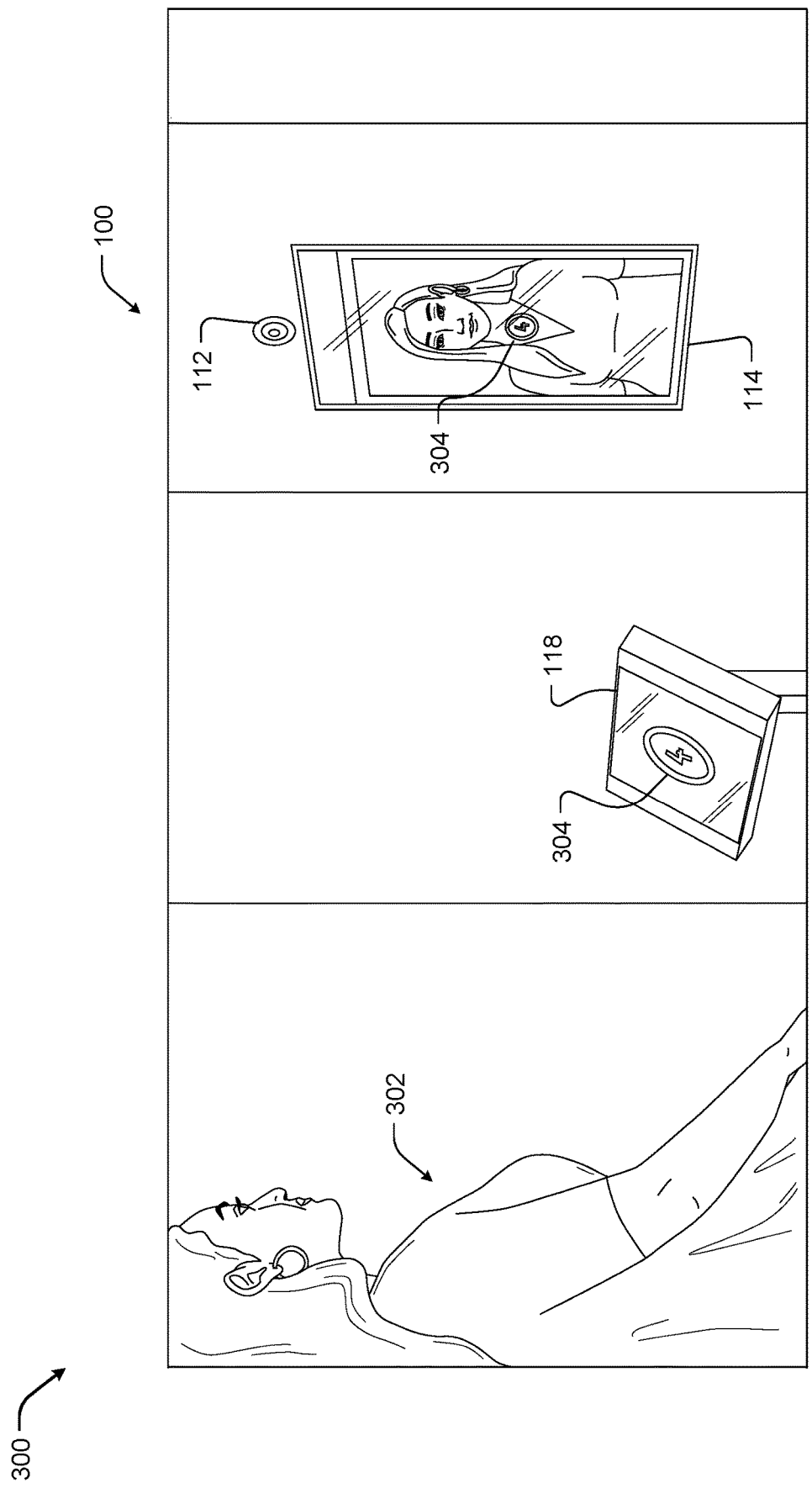
FIG. 3 illustrates an example subject during a photo capture session of the photobooth system according to some implementations.

FIG. 3 illustrates an example 300 subject 302 during a photo capture session of the photobooth system 100 according to some implementations. As discussed above, the photobooth system 100 may include a center column that includes one or more image devices 112, a viewing screen 114, and a user interface 118. In the current example, the subject 302 has initiated a photo session, such as by selecting a start or ready icon on the user interface 118. The subject 302 is able to view the current image feed or image data via the viewing screen 114 as shown. In other words, the data captured by the image device 112 is shown in substantially real-time to the subject 302 via the viewing screen 114.

In this example, the subject 302 may also view a countdown timer 304 so that the subject 302 is aware of when the photo will be captured. As illustrated, the countdown timer 304 is displayed both on the user interface 118 and on the viewing screen 114. In other examples, the countdown timer 304 may be displayed only on the user interface 118, such as to avoid obstructing the image data feed displayed on the viewing screen 114, or only on the viewing screen 114. Accordantly, it should be understood that the countdown timer 304 may be displayed on either or both of the viewing screen 114 and the user interface 118 in various examples.

Figure 4:
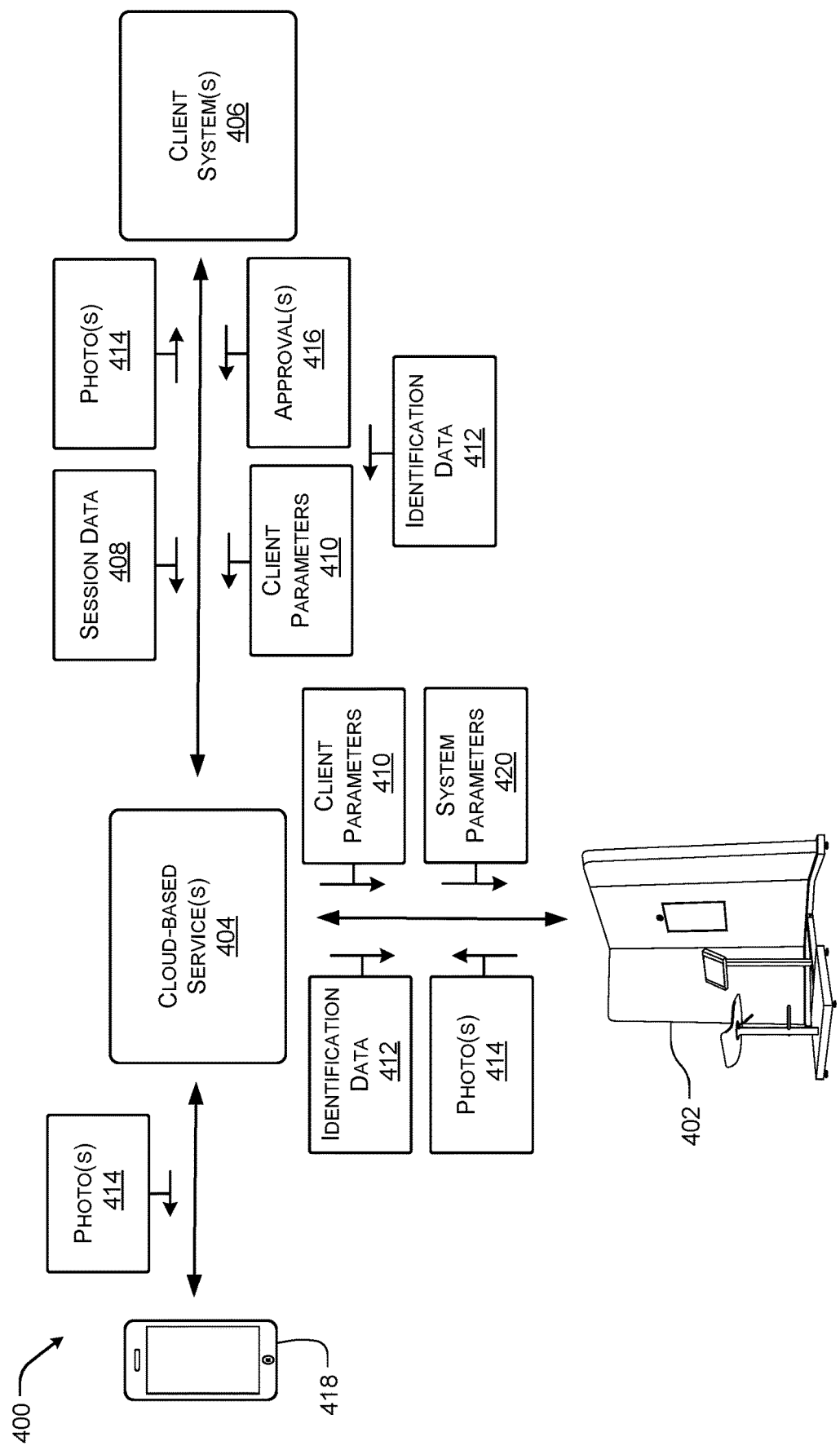
FIG. 4 illustrates an example block diagram view of the photobooth system according to some implementations.

FIG. 4 illustrates an example block diagram view 400 of the photobooth system 100 according to some implementations. As discussed above, the photobooth system 100 may include the photobooth 402 in communication, such as via one or more networks (not shown), with a cloud-based service 404. The could-based service 404 may be in further communication with one or more client systems 406, for example, again via one or more networks (not shown).

In the current example, a client may request or otherwise schedule a photo session via the client system 406 and the cloud-based service 404. For instance, the client may access the cloud-based service 404 via the client system 406, such as via a downloadable or web-hosted application. The client may provide session data 408 to the cloud-based service 404 to schedule the session. For example, the session data 408 may include a service selection, a location, time, subject identification information, payment information, number of photos, and the like. The client system 406 may also provide, either during booking or subsequent to booking and prior to the session, client parameters 410. In some cases, the client parameters 410 may include photo style, photo sizes, dress codes, lighting or shadow effects, color palette, any required branding overlays or watermarks, or the like.

The cloud-based service 404 may then arrange for the photobooth 402 to be delivered to the location at the desired time. The booth 402 may then be assembled, as discussed above with respect to FIGS. 1-3, on-site. Once assembled or transitioned to the open position, the photobooth 402 may be communicatively coupled to the cloud-based service 404. The cloud-based service 404 may then provide the client parameters 410 as well as any other additional data, such as subject identification data 412. The photobooth 402 and/or the cloud-based service 404 may then confirm the identity of the subject via the identification data 412 and/or the session data 408.

The photobooth 402 may then capture photos 414 of the subject based at least in part on the client parameters 410 and any settings selected by the subject during the photo session. The photos 414 may, in some cases, be processed by the cloud-based service 404 but, ultimately, the photos 414 may be provided to the client system 406. In some examples, the client system 406 may provide final approval 416 for the photos 414 back to the cloud-based service 404 before the photobooth 402 is collected or transported to another location for another photo session. In some specific examples, such as illustrated, the photos 414 may also be provided to a user device 418 associated with the subject, such that the subject may also utilize the photos 414 for personal use.

FIGS. 5-10 are flow diagrams illustrating example processes associated with the photobooth system according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 5:
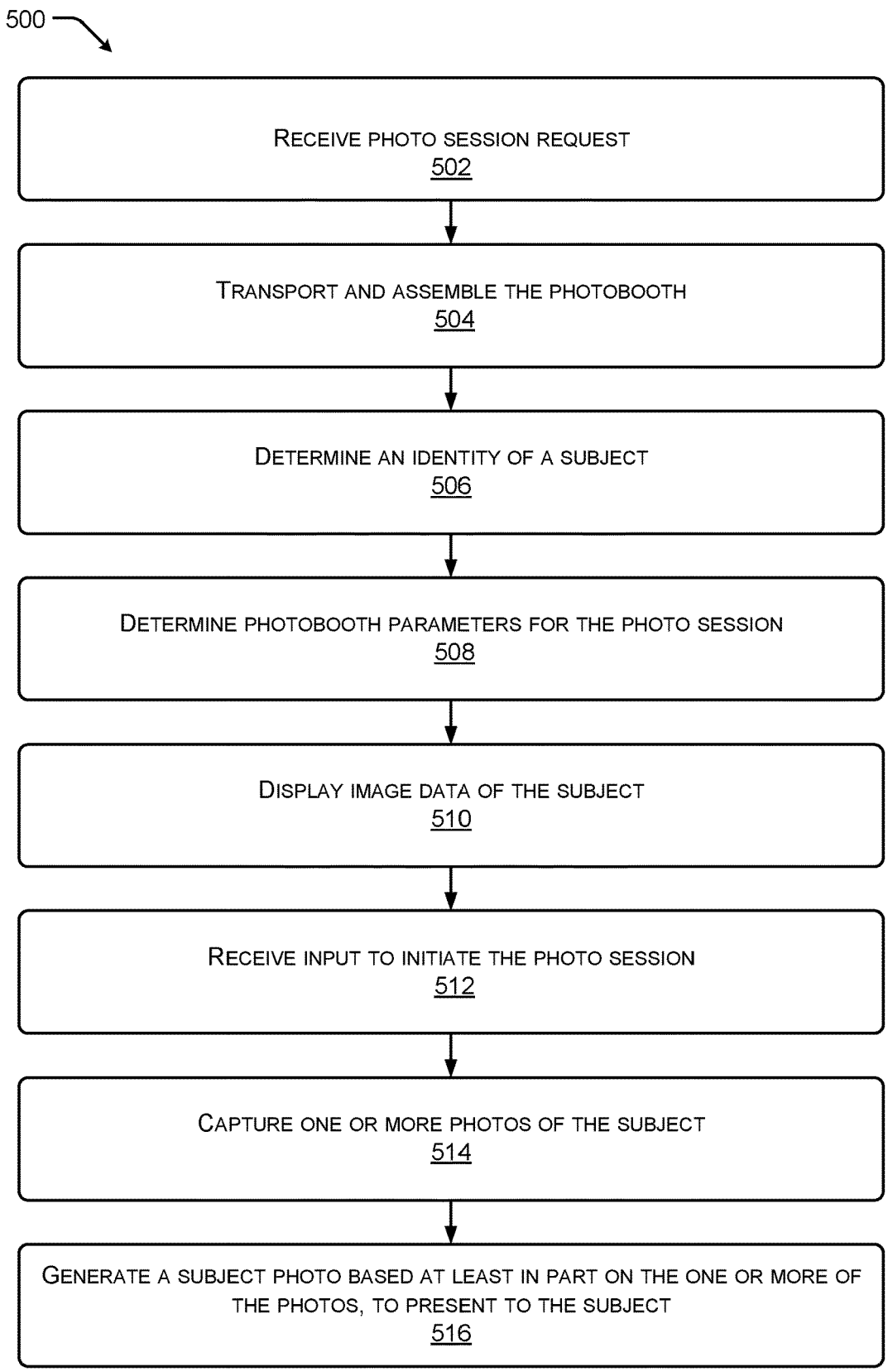
FIG. 5 is an example flow diagram showing an illustrative process associated with the photobooth system of FIGS. 1-4 according to some implementations.

FIG. 5 is an example flow diagram showing an illustrative process 500 associated with the photobooth system of FIGS. 1-4 according to some implementations. As discussed above, in some cases, a cloud-based service may be utilized by a client (e.g., an organization, business, entity, individual, or the like) to schedule a photo session at a desired location and at a desired time (such as for a specific window of time). The photobooth may be delivered to the desired location and for the length of the desired time to capture photos of the subject. The photobooth may then be collected and transported to a new location for another photo session associated with another client and subject. In these examples, it should be understood that the client and the subject may be different individuals.

At 502, the cloud-based service may receive a photo session request from a client, such as via a client system or device. For example, the request may be made via a downloadable application or web-hosted application. The request may include session data (such as subject position, subject appeal, or other look and feel related data), client parameters (such as image characteristics, booth settings, and the like), the location, the desired window of time, among others.

At 504, the photobooth may be transported and assembled at the location designated by the client. For example, the photobooth may be shipped in the closed position and then transitioned to an open or assembled position as discussed above.

At 506, the photobooth may determine an identity of the subject. For example, the subject may situate themselves at the designated position and the photobooth may capture image data of the subject and/or of an identifier (such as an employee badge or other credentials). The photobooth may then verify that the subject is the correct subject based at least in part on a comparison with the data provided by the client during the session request.

At 508, the photobooth may determine parameters for the photo session. For example, the photobooth may be equipped with one or more environmental sensors and utilize the sensor data together with any captured image data to determine parameters or settings for the booth. For example, the booth may determine settings for the light sources, image devices, and the like. In some cases, the parameters may also be determined based on client parameters or requests received from the client when the session was booked.

At 510, the photobooth may display image data of the subject via the viewing screen and/or user interface. In this case the image data may allow the subject to determine they are ready to begin the photo session.

At 512, once the subject is in position and the booth is ready, the photobooth may receive an input to initiate the photo session. For example, the subject may select an option or button via the user interface that may start a countdown timer for the photo captures when the subject feels they are ready.

At 514, the photobooth may capture one or more photos of the subject. For example, the photobooth may display a countdown timer for a predetermined number of photos, such that the subject may have and be aware of a small break between each photo capture.

At 516, the photobooth and/or the cloud-based service may generate a subject photo based at least in part on the one or more of the photos, to present to the subject. For example, the photobooth system may select a subset of one or more of the photos to present to the subject for review. In some cases, the photobooth system may present all of the captured photos for the review by the subject. In one specific example, the photobooth system may analyze the captured photos, such as via one or more machine learned models or networks, to select photos that meet or exceed a criterion associated with the client parameters and/or the session data, such that the subject is presented with photos that meet the client's specifications.

In some examples, at 514 and 516, the photobooth may be configured to capture a series of frames or photos of the subject while parameters of the photobooth (e.g., lighting, image device, or the like are adjusted). In this manner, the subject and/or the client may be able to review a series of photos that have different conditions (such as lighting or exposure). The subject and/or the client may then select one or more of the photos. The selected photos may then be merged or otherwise combined into a single final photo. In some cases, the selected photos may be utilized by the photobooth to determine final parameter set that may be applied for a subsequent photo session that may result in the final photo or photos being generated.

In some cases, once the final parameters set is determined, the selected photos are combined, or a final photo or photos are generated, the subject and/or the client may be presented with a user interface on a display, such as the user interface or viewing screen, to allow the subject and/or client to adjust the final photo(s) in various ways. For example, the subject and/or client may adjust the photo lighting (for instance, using a sliding brightness scale, shadow scale, light source(s) position scale, number of light source(s), or the like), adjust color (e.g., tone, hue, and the like), further crop the photo(s), further merger or combine aspects or features of the photo(s), and the like. Once the subject and/or client completes their editing of the photo(s), the system (e.g., photobooth and/or cloud-based service) may generate a new final photo or photos based on the user inputs and options. In some cases, the system may allow the subject and/or client to perform multiple rounds of editing prior to finalizing the photo or photos.

In other examples, in addition to capturing a series of photos or frames with varying parameters of the photobooth, the system may be configured to instruct the subject (such as visa the viewing screen and/or user interface) to adjust their features. For instance, the photobooth may instruct and capture a series of photos or frames while the subject transition from a serious face to a smile. As another instance, the photobooth may instruct and capture a series of photos or frames while the subjects looks from right to left (e.g., moves their head from side to side) or up and down (e.g., tilts their head up and down). Again, these series of photos or frames may be selected by the subject or client to generate a final photo or photos for use.

Figure 6:
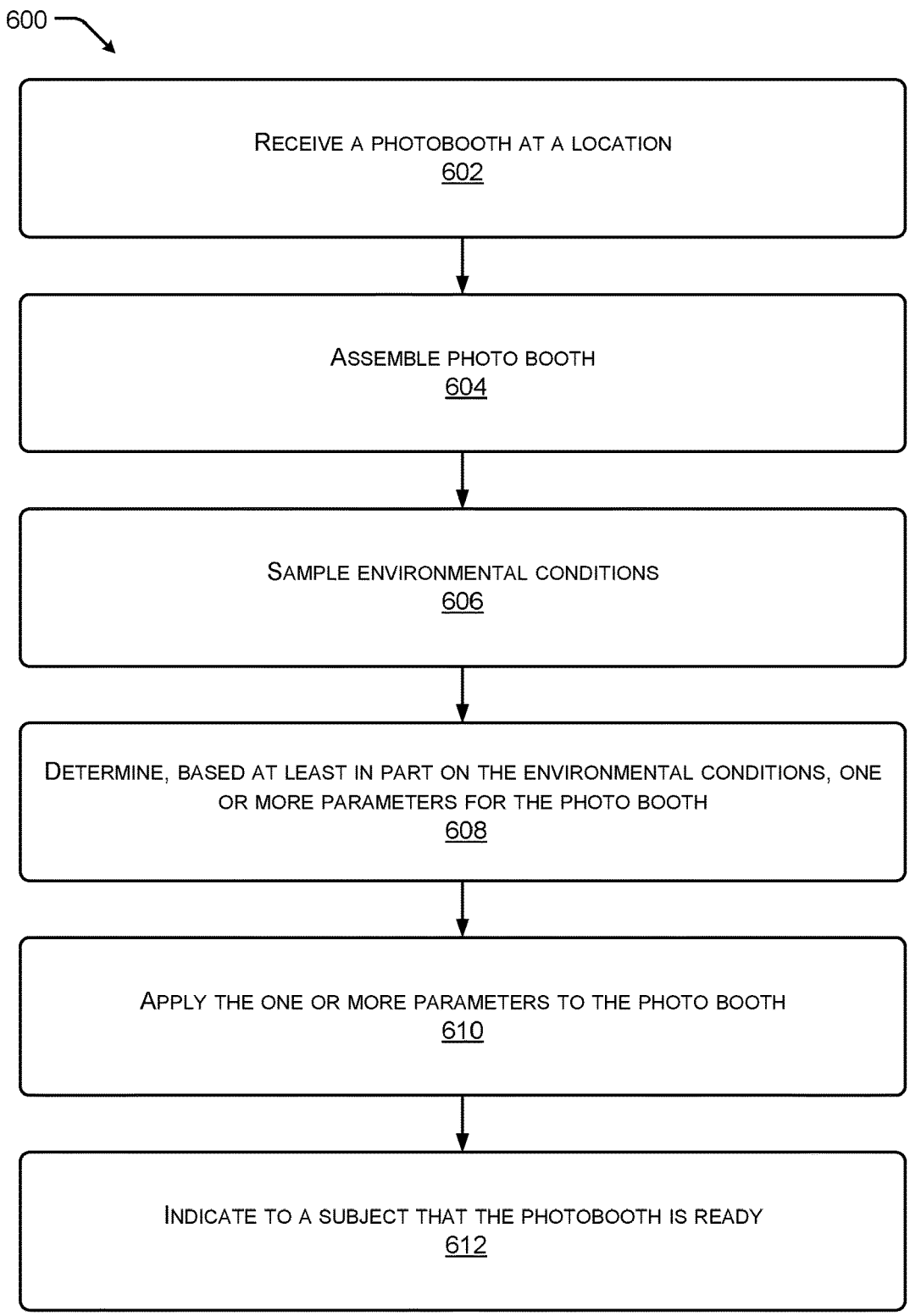
FIG. 6 is another example flow diagram showing an illustrative process associated with the photobooth system of FIGS. 1-4 according to some implementations.

FIG. 6 is another example flow diagram showing an illustrative process 600 associated with the photobooth system of FIGS. 1-4 according to some implementations. As discussed above, the photobooth may arrive at a desired location in a first position (such as a closed or shipping position) and be transitioned to an open or assembled position for the photo session.

At 602, the photobooth may be received at a location. For example, the location may be designated by the client and be associated with a subject, such as the subject's home or place of work.

At 604, the photobooth may be assembled. For example, the right, left, and center columns may be raised or transitioned from the closed position to the upright position, such as via a hinged connection between the columns and the base. In some cases, the user interface and/or the seat may also be attached or transitioned from the closed downward portion to an upright position.

At 606, the photobooth may sample the environmental conditions, such as via one or more sensor or the image devices associated therewith and, at 608, the photobooth may determine, based at least in part on the environmental conditions, one or more parameters for the photobooth. For example, the photobooth may sample ambient light and adjust a settings associated with one or more of the lighting zones based on the ambient conditions to, for instance, reduce shadows. In some cases, the system may also determine a skin tone of the subject to assist with selecting one or more parameters for the photobooth. Accordingly, the photobooth may select the one or more parameters based on the determined skin tone.

At 610, the photobooth may apply the one or more parameters and, at 612, the photobooth may indicate to the subject that the photobooth is ready. For example, the photobooth may present a welcome screen with one or more selectable options (that may in some cases be preapproved by the client during booking of the session). In other examples, the photobooth may display a user selectable icon or highlight a button that may allow the subject to commence or start the photo session when ready.

Figure 7:
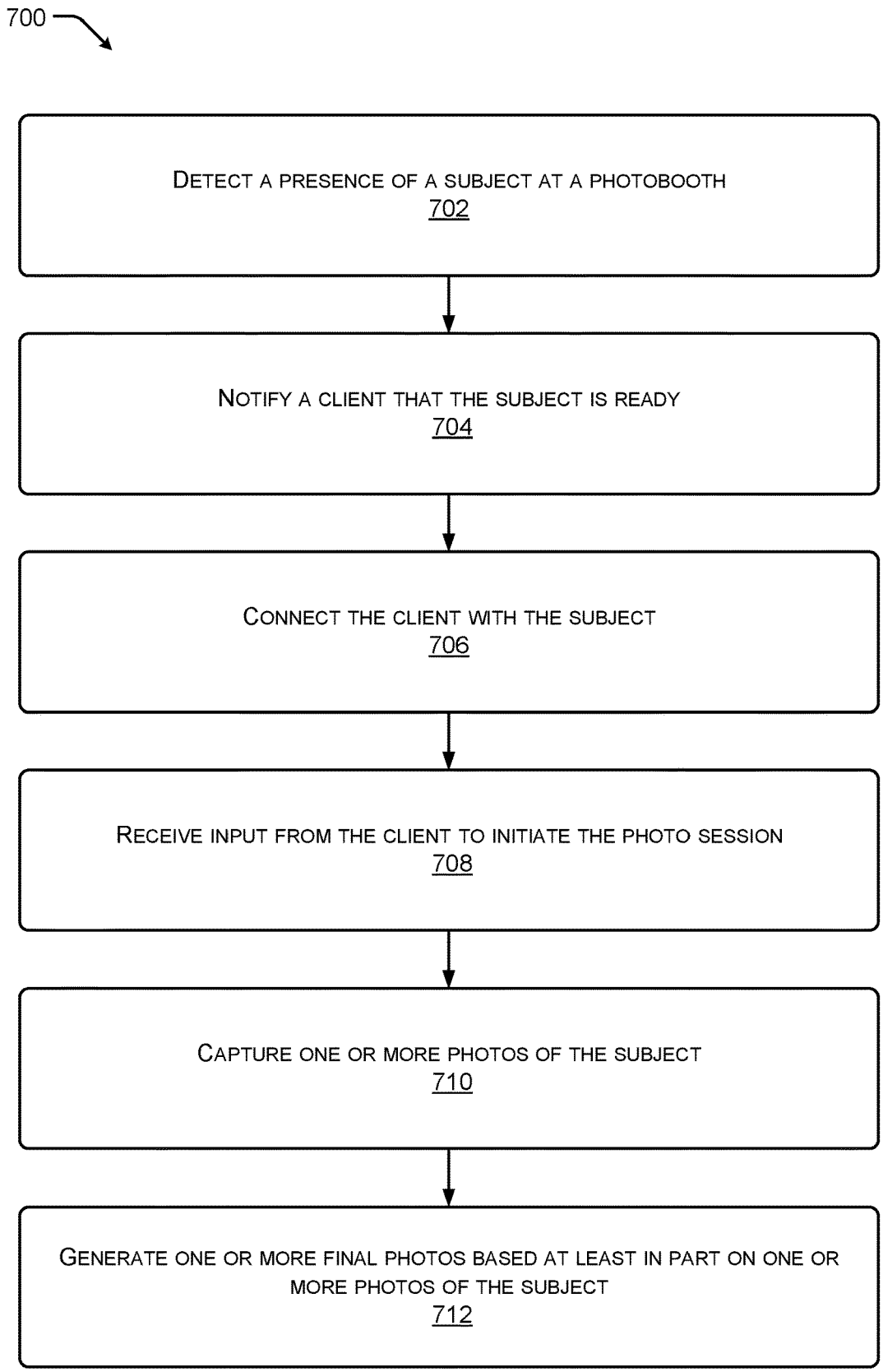
FIG. 7 is another example flow diagram showing an illustrative process associated with the photobooth system of FIGS. 1-4 according to some implementations.

FIG. 7 is another example flow diagram showing an illustrative process 700 associated with the photobooth system of FIGS. 1-4 according to some implementations. In some examples, the photobooth system may allow a client or client representative (or other third-party individual that is not on site, such as a family member or friend) to participate in the photo session.

At 702, the photobooth may detect the presence of a subject. For example, the photobooth may determine the subject is seated or present at the designated position and ready to begin the photo session. In one example, the subject may select on option to notify the photobooth that the subject is ready to begin.

At 704, the photobooth may notify a client or the client representative that the subject is ready to commence the photo session and, at 706, the photobooth may connect the client (or the client representative, friend, family member, or other individuals) with the subject. For example, the photobooth may provide a video and or audio feed that is usable by the client representative and/or the subject to interact with each other. Thus, the client representative may be able to view the image data captured of the subject in substantially real-time and provide feedback.

At 708, the photobooth may receive an input to initiate the photo session. For example, the subject may select an option or button via the user interface that may start a countdown timer for the photo captures when the subject feels they are ready. In this example, the client may also provide the input to commence the photo session in addition to or in lieu of the subject.

At 710, the photobooth may capture one or more photos of the subject. For example, the photobooth may display a countdown timer for a predetermined number of photos, such that the subject may have and be aware of a small break between each photo capture.

At 712, the photobooth and/or the cloud-based service may generate a final photo based at least in part on the one or more of the photos, to present to the subject. For example, the photobooth system may select a subset of one or more of the photos to present to the subject and/or the client representative for review. In some cases, the photobooth system may present all of the captured photos for the review by the subject and/or the client representative. In one specific example, the photobooth system may analyze the captured photos, such as via one or more machine learned models or networks, to select photos that meet or exceed a criterion associated with the client parameters and/or the session data, such that the subject is presented with photos that meet the client's specifications.

Figure 8:
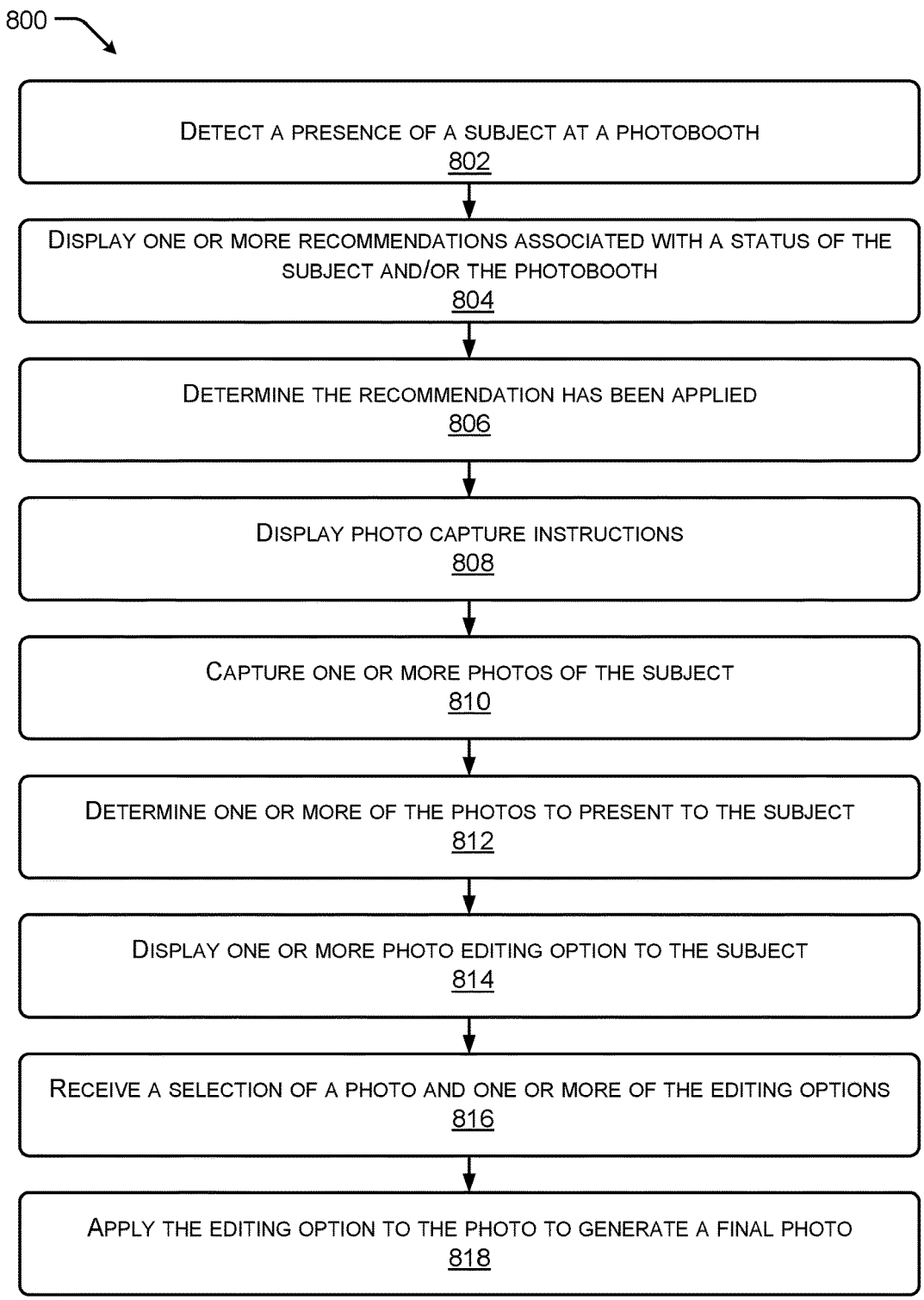
FIG. 8 is another example flow diagram showing an illustrative process associated with the photobooth system of FIGS. 1-4 according to some implementations.

FIG. 8 is another example flow diagram showing an illustrative process 800 associated with the photobooth system of FIGS. 1-4 according to some implementations. In some examples, the photobooth may be configured to provide real-time feedback to the subject in order to improve the overall results of the photo session during the window of time. In this manner, the photobooth may reduce retakes and generate photos of higher quality and more representative of the parameters or conditions set by the client.

At 802, the photobooth may detect the presence of a subject. For example, the photobooth may determine the subject is seated or present at the designated position and ready to begin the photo session. In one example, the subject may select on option to notify the photobooth that the subject is ready to begin.

At 804, the photobooth may display one or more recommendations associated with a status of the subject and/or the photobooth. For example, the photobooth may recommend or display a target for the subjects' eyes, adjustments to a head position, posture, body tilt, or the like. In some cases, the recommendation may be related to the apparel of the subject, such as recommending that a t-shirt is too informal for a corporate photo or that a different color may go better with the subject skin or eye colors. The recommendation may also relate to the photobooth, such as to lower or raise the seat or seat, adjust a lighting parameter, or the like.

At 806, the photobooth may determine that the recommendation has been applied. For example, the photobooth may determine based on image data from the image device that the seat or seat has been lowered, the subject has changed, or that the recommended setting has been applied. In some cases, the booth may allow the subject to override or otherwise ignore the recommendation, such as via a user selection on the user interface.

At 808, the photobooth may display photo capture instructions. The photobooth may display the instructions or process for the photo session on the viewing screen and/or on the user interface. For example, the photobooth may explain how the countdown timer and/or photo review and selection process may proceed.

At 810, the photobooth may capture one or more photos of the subject. For example, the photobooth may display a countdown timer for a predetermined number of photos, such that the subject may have and be aware of a small break between each photo capture.

At 812, the photobooth and/or the cloud-based service may determine one or more of the photos to present to the subject. For example, the photobooth system may select a subset of one or more of the photos to present to the subject and/or the client representative for review. In some cases, the photobooth system may present all of the captured photos for the review by the subject and/or the client representative. In one specific example, the photobooth system may analyze the captured photos, such as via one or more machine learned models or networks, to select photos that meet or exceed a criterion associated with the client parameters and/or the session data, such that the subject is presented with photos that meet the client's specifications.

At 814, the photobooth may display one or more photo editing options to the subject and, at 816, the photobooth may receive a selection of a photo and one or more of the editing options. For example, the photos and the editing options may be displayed on the user interface and, thereby, selected by the subject.

At 818, the photobooth may apply the editing option to the photo to generate a final photo. In some cases, the photobooth may display the photo with the editing options in substantially real-time such that the subject may review the photo with and without the editing and select the combination that is must desirable to them.

In some examples, the subject, the client, the cloud-based service, and/or the photobooth may apply additional post photo editing. For example, the subject or client may utilize sliders to adjust various parameters such as color, cropping, blur, lighting, focus, brightness, contrast, highlights, shadows, saturation, warmth, tint, skin tone, blue tone, noise, add text or image (such as logos), and the like. Likewise, the system (e.g., the cloud-based service and/or the photobooth) may be configured, such as via one or more machine learned models and/or networks, to analyze the captured photos and to adjust one or more of the various parameters, such as those listed above, to improve the overall quality of the resulting or final photo, photos, series of frames, or video.

Figure 9:
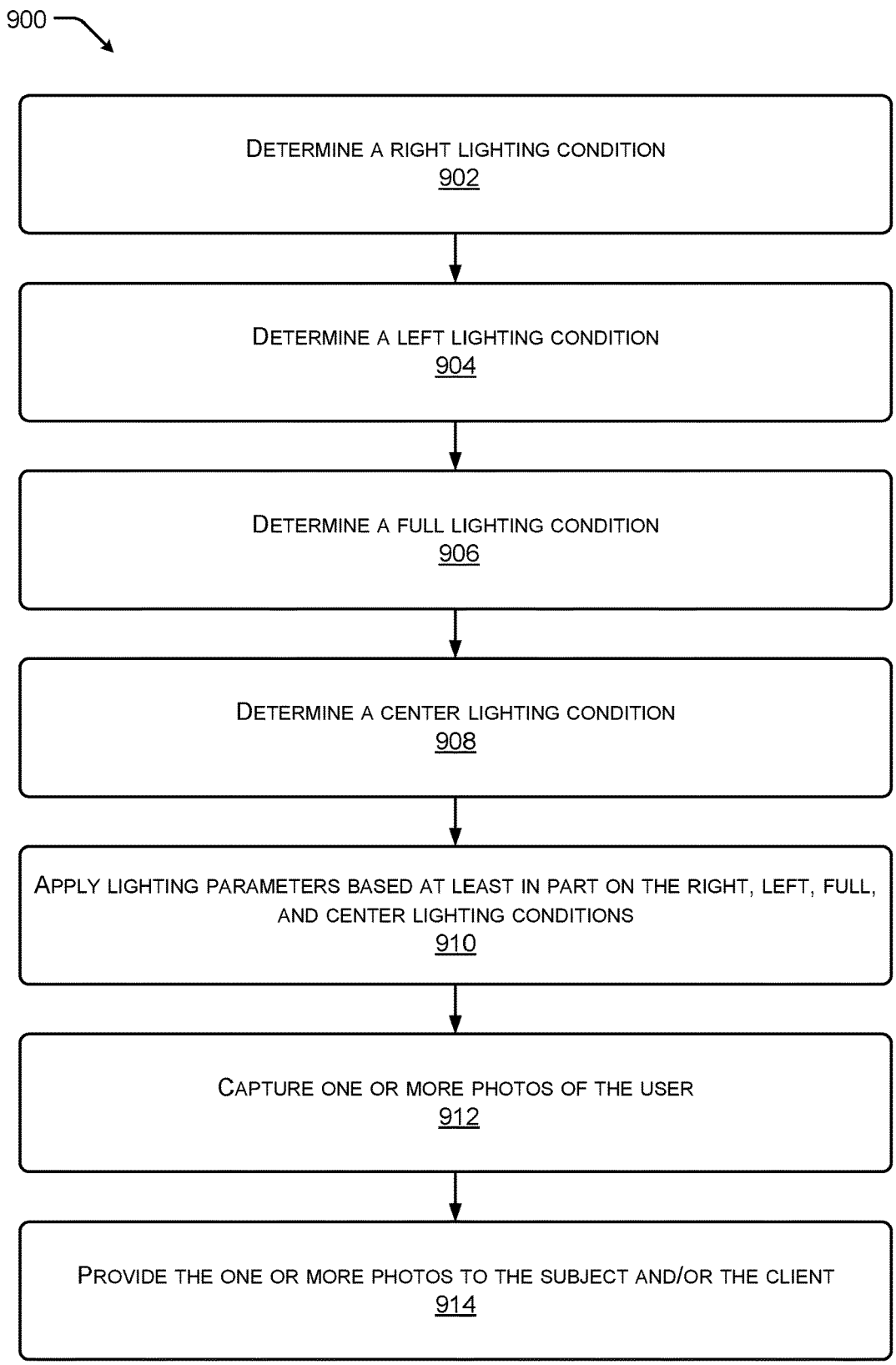
FIG. 9 is another example flow diagram showing an illustrative process associated with the photobooth system of FIGS. 1-4 according to some implementations.

FIG. 9 is another example flow diagram showing an illustrative process 900 associated with the photobooth system of FIGS. 1-4 according to some implementations. As discussed above, the photobooth may include a right column (or multiple right columns) and a left column (or multiple left columns) that may include one or more zones of adjustable lighting, such as an array or grid of adjustable light sources. In some cases, the lighting may be set on site and based at least in part on environmental conditions or feature of the subject (such as skin tone, clothing colors, or the like) at the time of the photo session.

At 902-908, the photobooth may determine a right lighting condition, a left a shadow left condition, parameter, a full lighting condition, and a center lighting condition. For example, the photobooth may capture initialization image data that may be used to determine the lighting conditions. In some cases, the initialization image data may be captured as the photobooth transitions between various lighting parameters, such that the booth and/or the cloud-based service may determine the lighting conditions (e.g., right, left, full, and center) with various different lighting conditions in the physical environment or with the subject seated at the designed position.

At 910, the photobooth may apply the apply lighting parameters based at least in part on the right lighting condition, the left lighting condition, the full lighting condition, and/or the center lighting condition. For example, the photobooth system may set lighting brightness for each zone of each column based at least in part on the determined shadow, glare, reflection, or other lighting condition.

At 912, the photobooth may capture one or more photos of the subject. For example, the photobooth may display a countdown timer for a predetermined number of photos, such that the subject may have and be aware of a small break between each photo capture.

At 914, the photobooth may provide the one or more photos to the subject and/or the client. For example, the photobooth may allow the subject to review and initiate retakes at a time proximate to the original photo session via the photobooth itself. The photos may also be delivered digitally to a device associated with the client and/or the subject.

Figure 10:
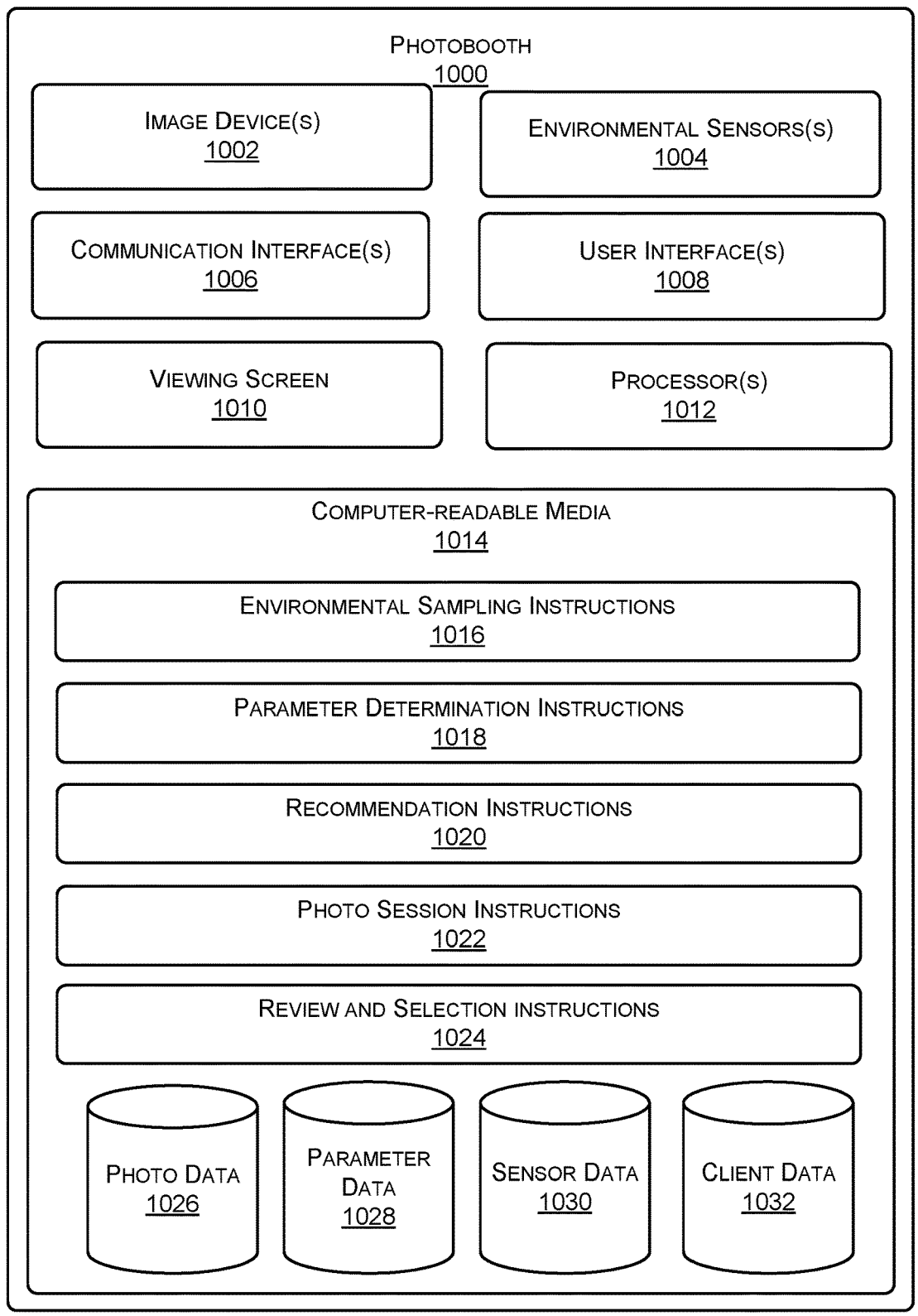
FIG. 10 is an example block diagram of a photobooth to according to some implementations.

FIG. 10 is an example block diagram of a photobooth 1000 to according to some implementations. As described above, the photobooth 1000 may include one or more image devices 1002. The image devices 1002 may be of various sizes and quality, for instance, the image devices 1002 may include one or more wide screen cameras, high definition cameras, video cameras, depth cameras, stereo pair cameras, red-green-blue cameras, among other types of cameras. It should be understood that the image devices may be used in combination or independently to generate photos of a subject.

The photobooth 1000 may also include one or more environmental sensors 1004. For example, the environmental sensors 1004 may include heat sensors or temperature sensors, ambient light sensors, motion sensors, pressure or weight sensors (such as associated with the seat or designated position), and the like. in some cases, the sensor data may be used to determine parameters or settings associated the photobooth as well as assist on determining a time to capture the photos using the image devices 1002.

The photobooth 1000 may also include one or more communication interfaces 1006 that are configured to facilitate communication between one or more networks and/or one or more cloud-based services or client systems. The communication interfaces 1006 may also facilitate communication between one or more wireless access points, a master device, and/or one or more other computing devices as part of an ad-hoc or home network system. The communication interfaces 304 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 1006 may also enable device to device communication such as between one or more printers and/or one or more other electronic devices in proximity to the user.

The user interfaces 1008 may include both output interfaces for displaying or providing information to an end user and input interfaces for receiving user inputs from the end user. The user interfaces 1008 may include various systems for interacting with the photos, such as a touch enabled display. The photobooth 1000 may also include a viewing screen or display 1010 to present data, such as image data, to the subject during a photo session. In some examples, the user interface 1008 and the viewing screen 1010 may be combined.

The photobooth 1000 may include one or more processors 1012, such as at least one or more access components, control logic circuits, central processing units, or processors, as well as one or more computer-readable media 1014 to perform the function of the photobooth 1000 and/or store content. Additionally, each of the processors 1012 may itself comprise one or more processors or processing cores.

Depending on the configuration, the computer-readable media 1014 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1012.

Several modules such as instruction, data stores, and so forth may be stored within the computer-readable media 1014 and configured to execute on the processors 1012. For example, as illustrated, the computer-readable media 1014 stores environmental sampling instructions 1016 associated with controlling and capturing sensor data via the sensors 1004, parameter determination instructions 1018 to determine one or more parameters or settings for the photobooth 1000 based at least in part on client parameters or data, sensor data or image data captured by the photobooth 1000, and inputs by the subject via the user interface 1008, recommendation instructions 1020 for providing recommendations to the subject, photo session instructions 1022 for performing the photo capture session, review and selection instructions 1024 for providing review and selections of photos to the subject and/or the client, among other instructions (such as an operating system). The computer-readable media 1014 may also store data, such as photo or image data 1026, parameter data 1028, sensor data 1030, and/or client data 1032, among other types of data.

Although the subject matter has been described in language specific to structural features, it is to be understood that the subject matter defined in the appended claims is not necessarily limited to the specific features described. Rather, the specific features are disclosed as illustrative forms of implementing the claims.

Example Clauses A. A photobooth comprising: an upright assembly moveably including a first column and a second column, the first column including an image device and a viewing screen and the second column including at least one light source, and wherein the photobooth may transition from a closed position with the upright assembly in a first position substantially parallel to a floor to an open position with the upright assembly in an second position substantially perpendicular to the floor; a center console including a user interface; one or more processors; non-transitory computer-readable media storing computer-executable instructions, which when executed by the one or more processors cause the one or more processors to perform operations comprising: concurrently with capturing image data of a subject, displaying the image data on the viewing screen; responsive to receiving a user input to initiate a photo capture session, displaying a countdown timer on at least one of the viewing screen or the user interface; and capturing, upon the expiration of the countdown timer, a photo of the subject.

B. The photobooth as recited in A, further comprising one or more communication interfaces for proving the photo to a remote client device.

C. The system as recited in A, further comprising at least one sensor and wherein the operations further comprise: detecting a condition associated with an environmental surrounding the photobooth or the subject; determining a parameter associated with the photobooth based at least in part on the condition; and applying the parameter to the photobooth prior to starting the countdown timer.

D. The photobooth as recited in A, wherein the operations further comprise: detecting, based at least in part on image data captured by the image device, a condition associated with the subject; determining a recommendation based at least in part on the condition; and displaying the recommendation on at least one of the viewing screen or the user interface.

E. The photobooth as recited in A, wherein the upright assembly further comprising a third column, the third column including at least two zones, each zone including at least one lighting source.

F. The photobooth as recited in A, further comprising a seat, the center console positioned between the upright assembly and the seat.

G. The photobooth as recited in A, further comprising one or more communication interfaces for receiving client data and wherein the operations further comprise: determining at least one parameter of the photobooth based at least in part on the client data; and applying the at least one parameter prior to starting the countdown timer.

H. A method comprising: receiving a request at a cloud-based service, the request including location data, a time data, and subject data; scheduling, by the cloud-based service, a delivery of a photobooth to a location associated with the location data at a time associated with the time data; capturing, by the photobooth, image data; determining, based at least in part on the image data and the subject data, that the subject is present; receiving a user input, via a user interface of the photobooth, to commence a photo session; responsive to receiving the user input, starting a countdown timer, the countdown timer displayed on a viewing screen associated with the photobooth concurrently with image data of the subject captured by an image device of the photobooth, the viewing screen different from the user interface; and upon the expiration of the countdown timer, capturing a first photo of the subject.

I. The method as recited in any of H, further comprising: receiving, at the cloud-based service, as part of the request client parameters; providing, to the photobooth, the client parameters; and applying, by the photobooth, the client parameters.

J. The method as recited in H, further comprising: upon the expiration of the countdown timer, commencing a second countdown timer, the second countdown timer displayed on the viewing screen concurrently with image data of the subject; and upon the expiration of the second countdown timer, capturing a second photo of the subject.

K. The method as recited in H, further comprising: sending the first photo and the second photo to the client device; and receiving, at the cloud-based service, an approval of the at least one of the first photo or the second photo; and responsive to receiving the approval, scheduling a pickup of the photobooth.

L. The method as recited in H, wherein displaying on the user inface the first photo and the second photo to the client device; and receiving, via the user interface, a selection of the at least one of the first photo or the second photo; responsive to receiving the selection, sending the first photo and the second photo to the client device.

M. The method as recited in H, further comprising: determining a first setting for a first zone of a left lighting column of the photobooth, a second setting for a second zone of the left lighting column, a third setting for a first zone of a right lighting column of the photobooth, and a fourth setting for a second zone of the right lighting column.

N. The method as recited in M, wherein determining the first setting, the second setting, the third setting, and the fourth setting is based at least in part on one or more of: sensor data associated with an environment surrounding the photobooth; image data associated with an environment surrounding the photobooth; or the client parameters.

O. A photobooth comprising: a first light source; a second light source; an image device; one or more processors; non-transitory computer-readable media storing computer-executable instructions, which when executed by the one or more processors cause the one or more processors to perform operations comprising: determining, based at least in part on first image data captured by the image device, at least one parameter of the first light source, the second light source, or the image device; concurrently with capturing second image data, displaying the second image data on the viewing screen, the second image data representative of a subject; responsive to receiving a user input via a user interface to initiate a photo capture session, concurrently displaying the second image data and a countdown timer on the viewing screen; capturing, upon the expiration of the countdown timer, a photo of the subject.

P. The photobooth as recited in O, further comprising one or more communication interfaces for proving the photo to a remote client device.

Q. The photobooth as recited in O, further comprising at least one sensor and wherein the determining the at least one parameter of the first light source, the second light source, or the image device further comprises: detecting a condition associated with an environmental surrounding the photobooth or the subject; determining a parameter associated with the photobooth based at least in part on the condition; and applying the parameter to the photobooth prior to starting the countdown timer.

R. The system as recited in O, wherein the at least one parameter includes a first brightness value for a first zone of the first light source, a second brightness value for a second zone of the first light source, a third brightness value for a first zone of the second light source, and a fourth brightness value for a second zone of the second light source.

S. The system as recited in O, further comprising: an upright assembly moveably including at least a first column, a second column, and the third column, the first column including the image device and the viewing screen, the second column including the first light source, and the third including the first light source; and a center console including the user interface.

T. The system as recited in O, further comprising one or more communication interfaces for receiving client data and wherein the determining the at least one parameter of the first light source, the second light source, or the image device is based at least in part on the client data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A photobooth comprising:
   a first light source;
   a second light source;
   an image device;
   one or more processors;
   non-transitory computer-readable media storing computer-executable instructions, which when executed by the one or more processors cause the one or more processors to perform operations comprising:
      determining, based at least in part on first image data captured by the image device, at least one parameter of the first light source, the second light source, or the image device;
      concurrently with capturing second image data, displaying the second image data on a viewing screen, the second image data representative of a subject;
      responsive to receiving a user input via a user interface to initiate a photo capture session, concurrently displaying the second image data and a countdown timer on the viewing screen;
      capturing, upon the expiration of the countdown timer, a photo of the subject; and
      wherein the at least one parameter includes a first brightness value for a first zone of the first light source, a second brightness value for a second zone of the first light source, a third brightness value for a first zone of the second light source, and a fourth brightness value for a second zone of the second light source.

2. The photobooth as recited in claim 1, further comprising one or more communication interfaces for proving the photo to a remote client device.

3. The photobooth as recited in claim 1, further comprising at least one sensor and wherein the determining the at least one parameter of the first light source, the second light source, or the image device further comprises:
   detecting a condition associated with an environmental surrounding the photobooth or the subject;
   determining a parameter associated with the photobooth based at least in part on the condition; and
   applying the parameter to the photobooth prior to starting the countdown timer.

4. The photobooth as recited in claim 1, further comprising:
   an upright assembly moveably including at least a first column, a second column, and the third column, the first column including the image device and the viewing screen, the second column including the first light source, and the third including the first light source; and
   a center console including the user interface.

5. The photobooth as recited in claim 1, further comprising one or more communication interfaces for receiving client data and wherein the determining the at least one parameter of the first light source, the second light source, or the image device is based at least in part on the client data.

6. The photobooth as recited in claim 4, wherein the upright assembly may transition from a closed position substantially parallel to a floor to an open position substantially perpendicular to the floor.

7. The photobooth as recited in claim 1, wherein the operations further comprise:
   capturing, by the image device, initialization image data;
   determining, based at least in part on the initialization image data and subject data, that a subject is present; and
   wherein starting the countdown timer is responsive to determining that the subject is present.

8. The photobooth as recited in claim 1, wherein the operations further comprise:
   receiving, from a cloud-based service, client parameters; and
   applying the client parameters to at least one of the first light source, the second light source, or the image device.

9. The photobooth as recited in claim 1, wherein the operations further comprise:
   upon the expiration of the countdown timer, commencing a second countdown timer, the second countdown timer displayed on the viewing screen concurrently with image data of the subject; and
   upon the expiration of the second countdown timer, capturing a second photo of the subject.

10. The photobooth as recited in claim 9, wherein the operations further comprise:
    sending the first photo and the second photo to a client device.

11. The photobooth as recited in claim 9, wherein the operations further comprise:
    displaying on the user inface the first photo and the second photo to the client device; and
    receiving, via the user interface, a selection of the at least one of the first photo or the second photo;
    responsive to receiving the selection, sending the first photo and the second photo to the client device.

12. The photobooth as recited in claim 1, wherein determining at least one parameter of the first light source, the second light source, or the image device is based at least in part on
    sensor data associated with an environment surrounding the photobooth.

13. The photobooth as recited in claim 1, wherein the first light source includes a plurality of illuminators and the second light source includes a second plurality of illuminators.

14. The photobooth as recited in claim 1, wherein determining at least one parameter of the first light source, the second light source, or the image device is based at least in part on client parameters.

15. A photobooth comprising:
a first light source including a first plurality of illuminators;
a second light source including a second plurality of illuminators;
an image device;
one or more processors;
non-transitory computer-readable media storing computer-executable instructions, which when executed by the one or more processors cause the one or more processors to perform operations comprising:
  determining, based at least in part on first image data captured by the image device, at least one parameter of the first light source, the second light source, or the image device;
  concurrently with capturing second image data, displaying the second image data on the viewing screen, the second image data representative of a subject;
  responsive to receiving a user input via a user interface to initiate a photo capture session, concurrently displaying the second image data and a countdown timer on the viewing screen;
  capturing, upon the expiration of the countdown timer, a photo of the subject; and
  wherein the at least one parameter includes a first brightness value for a first zone of the first plurality of illuminators, a second brightness value for a second zone of the first plurality of illuminators, a third brightness value for a first zone of the second plurality of illuminators, and a fourth brightness value for a second zone of the second plurality of illuminators.

16. A photobooth comprising:
a first light source including a first plurality of illuminators;
a second light source including a second plurality of illuminators;
an image device;
one or more processors;
non-transitory computer-readable media storing computer-executable instructions, which when executed by the one or more processors cause the one or more processors to perform operations comprising:
  concurrently with capturing second image data, displaying the second image data on the viewing screen, the second image data representative of a subject;
  responsive to receiving a user input via a user interface to initiate a photo capture session, concurrently displaying the second image data and a countdown timer on the viewing screen;
  capturing, upon the expiration of the countdown timer, a photo of the subject;
  upon the expiration of the countdown timer, commencing a second countdown timer, the second countdown timer displayed on the viewing screen concurrently with image data of the subject; and
  upon the expiration of the second countdown timer, capturing a second photo of the subject.

17. The photobooth as recited in in claim 16, wherein the operations further comprise:
determining, based at least in part on first image data captured by the image device, at least one parameter of the first light source, the second light source, or the image device.

18. The photobooth as recited in claim 16, further comprising at least one sensor and wherein the operations further comprise:
detecting a condition associated with an environmental surrounding the photobooth or the subject;
determining a parameter associated with the photobooth based at least in part on the condition; and
applying the parameter to the photobooth prior to starting the countdown timer.

19. The photobooth as recited in claim 16, wherein the operations further comprise:
detecting, based at least in part on image data captured by the image device, a condition associated with the subject;
determining a recommendation based at least in part on the condition; and
displaying the recommendation on at least one of the viewing screen or the user interface.

20. The photobooth as recited in claim 16, further comprising one or more communication interfaces for receiving client data and wherein the operations further comprise:
determining at least one parameter of the photobooth based at least in part on the client data; and
applying the at least one parameter prior to starting the countdown timer.

* * * * *